J. F. WEBB & J. F. WEBB, Jr.
MEANS FOR CONTROLLING THE OPERATION OF TRAINS.
APPLICATION FILED MAY 12, 1908.

928,350.

Patented July 20, 1909.
5 SHEETS—SHEET 1.

WITNESSES:
John T. Schrott
Charles H. Wagner

INVENTORS
Jean F. Webb,
Jean F. Webb, Jr.
BY
Fred G. Dieterich
ATTORNEYS

J. F. WEBB & J. F. WEBB, Jr.
MEANS FOR CONTROLLING THE OPERATION OF TRAINS.
APPLICATION FILED MAY 12, 1908.

928,350.

Patented July 20, 1909.
5 SHEETS—SHEET 2.

WITNESSES:
John J. Schrott
Charles H. Wagner

INVENTORS.
Jean F. Webb,
Jean F. Webb, Jr..
BY
Fred G. Dieterich
ATTORNEYS.

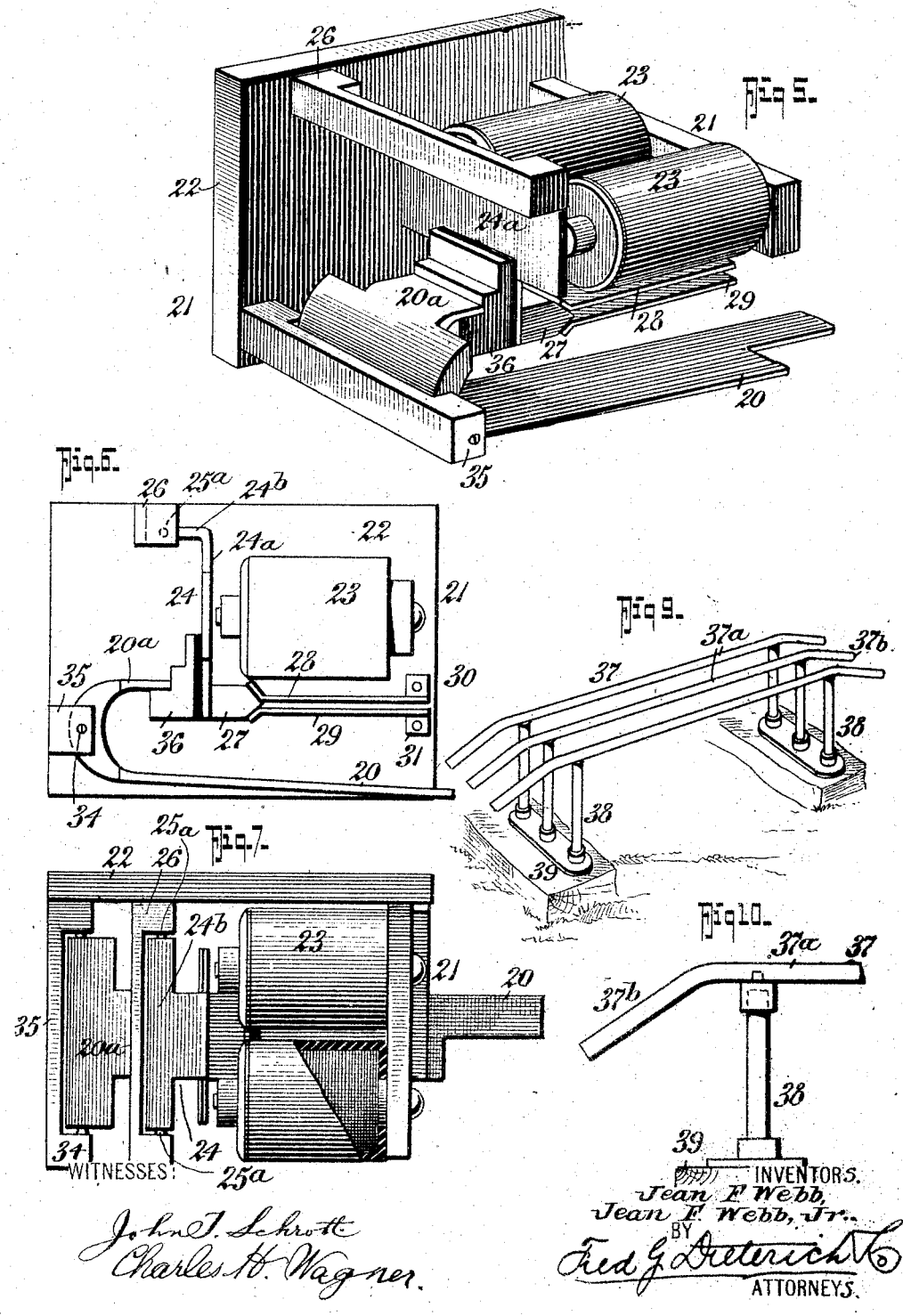

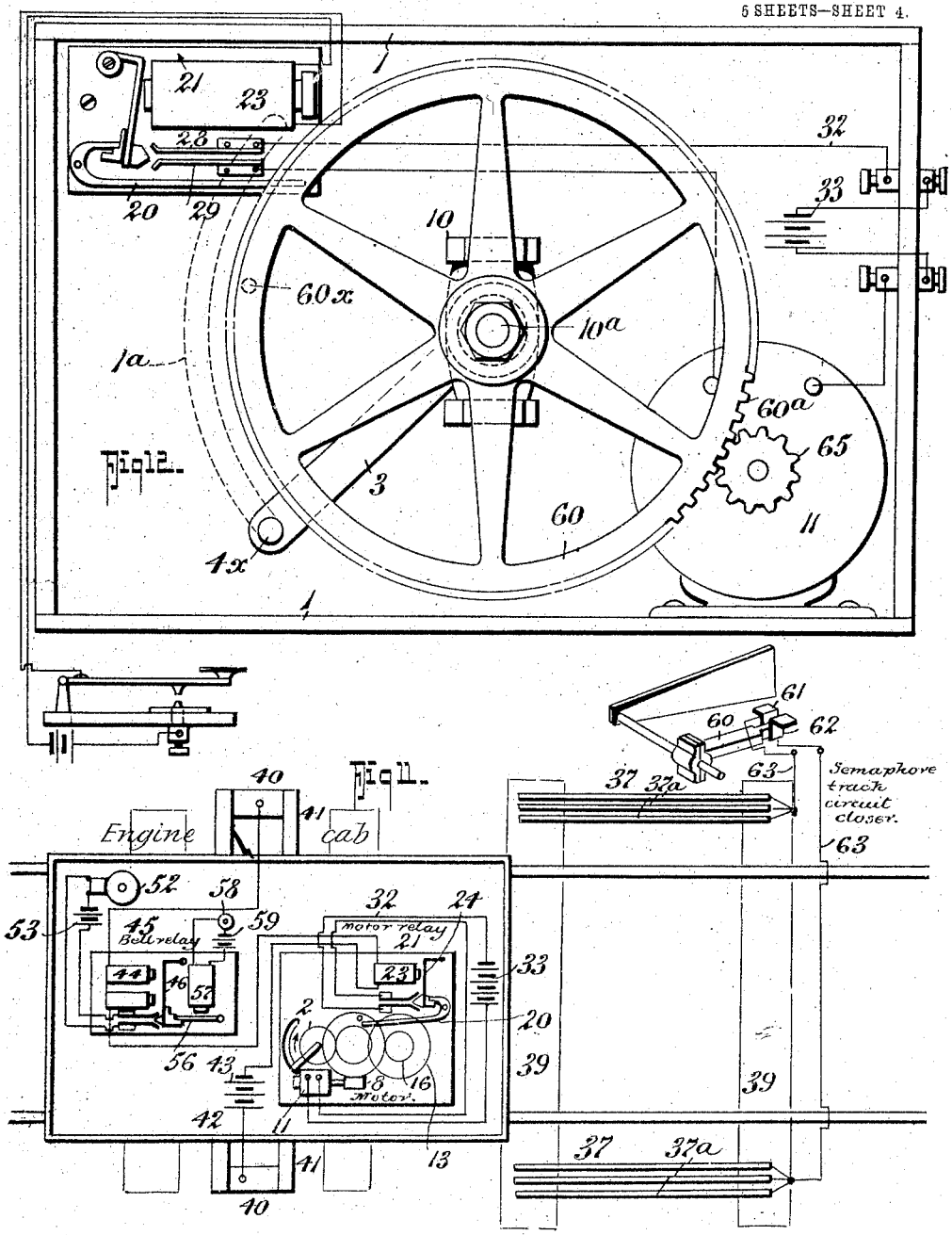

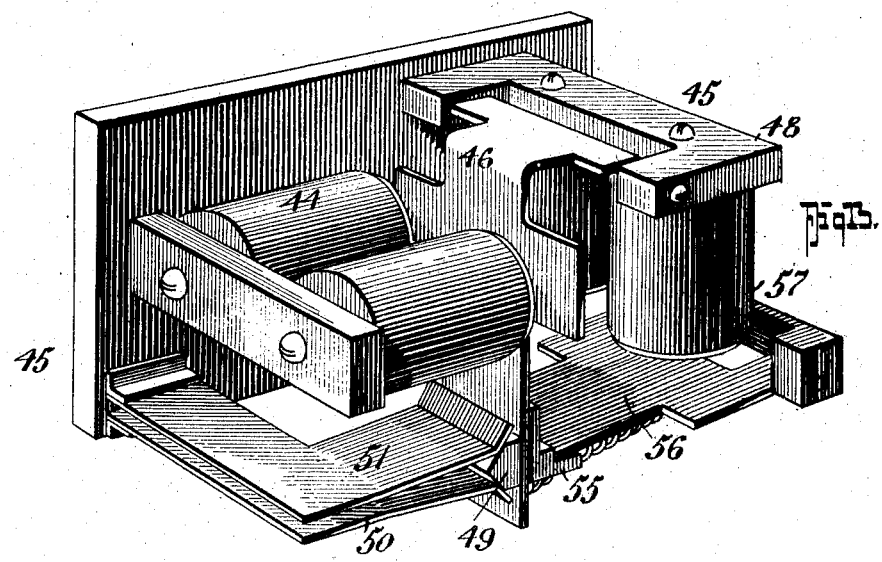
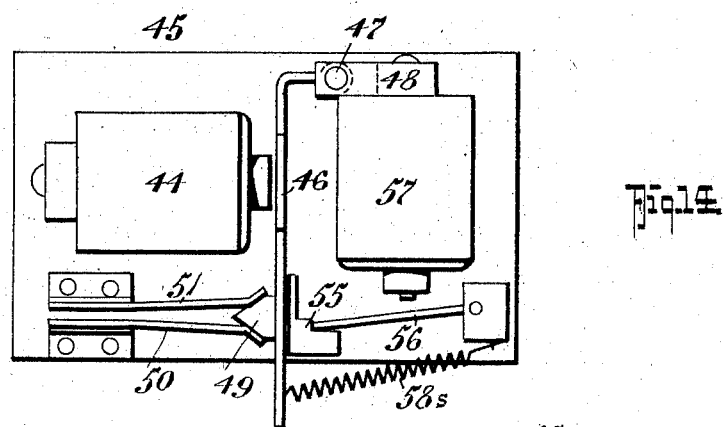
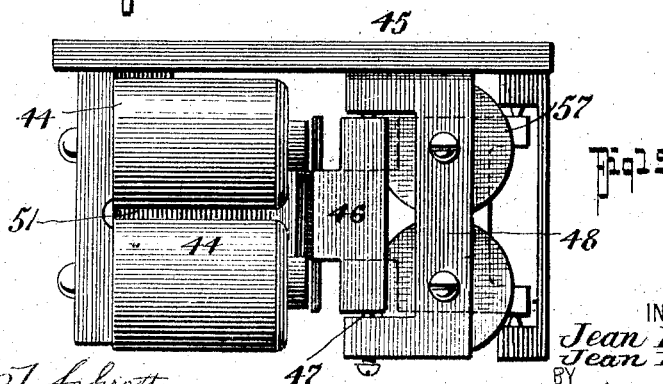

UNITED STATES PATENT OFFICE.

JEAN F. WEBB AND JEAN F. WEBB, JR., OF DENVER, COLORADO, ASSIGNORS TO THE ELECTRIC SIGNAGRAPH AND SEMAPHORE COMPANY, INCORPORATED, OF NEW YORK, N. Y.

MEANS FOR CONTROLLING THE OPERATION OF TRAINS.

No. 928,350.  Specification of Letters Patent.  Patented July 20, 1909.

Application filed May 12, 1908. Serial No. 432,330.

*To all whom it may concern:*

Be it known that we, JEAN F. WEBB and JEAN F. WEBB, Jr., residing at Denver, in the county of Denver and State of Colorado, have invented certain new and useful Improvements in Means for Controlling the Operation of Trains, of which the following is a specification.

Our invention relates to certain new and useful improvements in train stopping mechanism and in its generic nature the invention comprises an improved mechanism for operating an air valve of the brake mechanism to set the brakes on a train, should the same run past a station or block or danger signal, to stop the train, independently of the engineer and at the same time notify the engineer before setting the brakes.

In carrying out our invention we provide an air valve, connected to the train pipe of the brake mechanism, with a positively operated means controlled from a source away from the train, such as the signal operator or tower operator, to open the valve and set the brakes to stop the train. Means are also provided for operating an alarm in the engineers' cab, at a predetermined time, in advance of the setting of the brakes, so as to give the engineer an opportunity to stop his train if he has run by the signal inadvertently.

In its more subordinate nature, our invention resides in those details of construction, combination and arrangement of parts, all of which will be first fully described and then be specifically pointed out in the appended claims, reference being had to the accompanying drawings, in which,—

Figure 1:
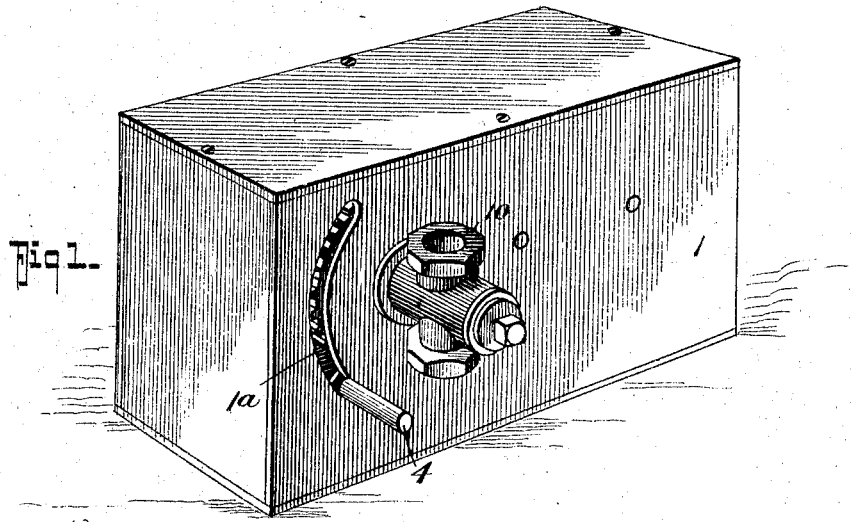
Figure 2:
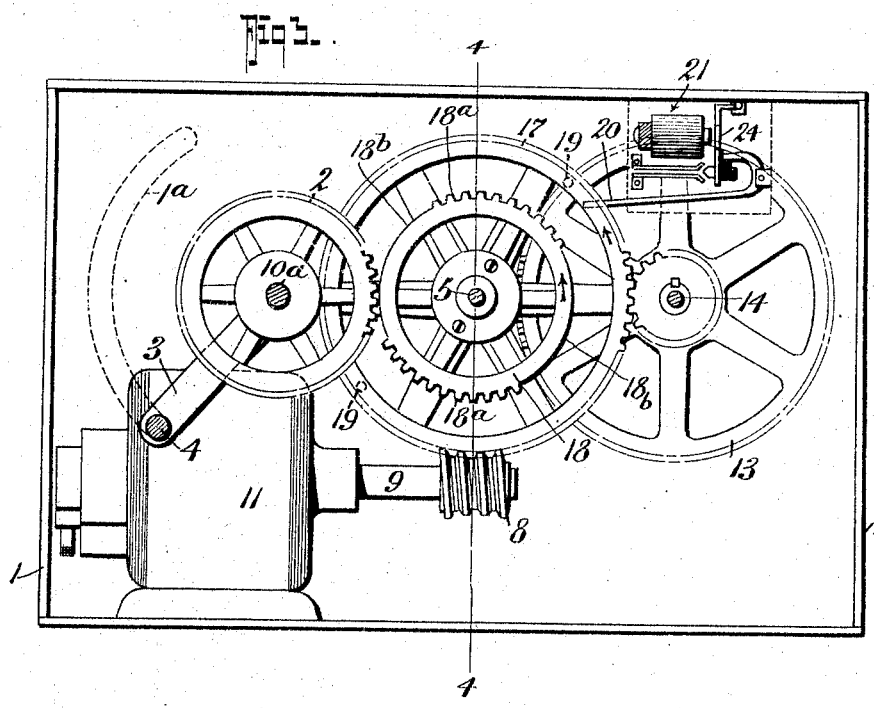
Figure 4:
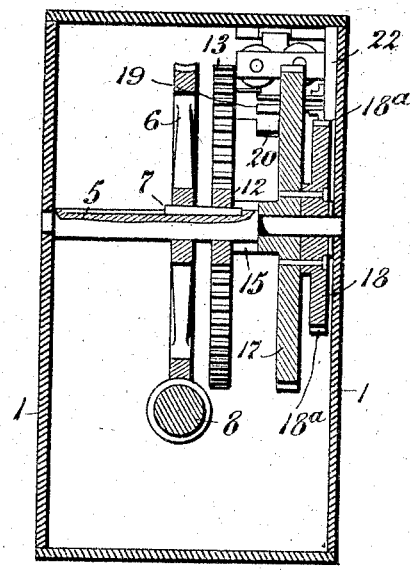
Figure 2:
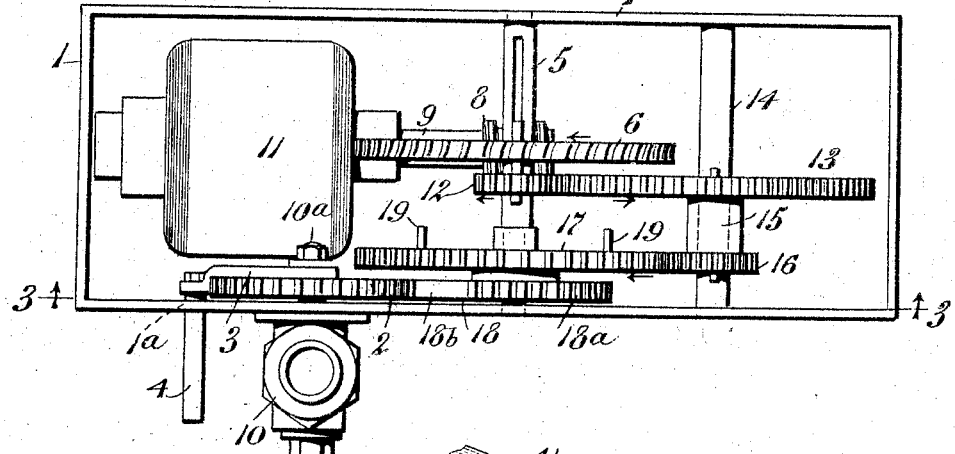
Figure 3:
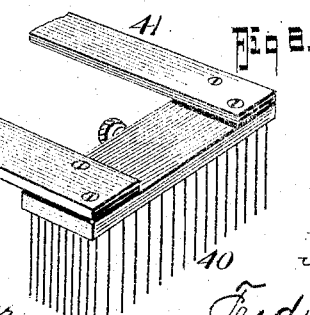

Figure 1, is a perspective view of the valve controlling mechanism. Fig. 2, is a top plan view thereof, the casing cover being removed. Fig. 3, is a section on the line 3—3 of Fig. 2. Fig. 4, is a cross section on the line 4—4 of Fig. 3. Fig. 5, is a perspective view of the circuit closing relay. Fig. 6, is a face view thereof. Fig. 7, is a plan view of the parts shown in Fig. 6. Fig. 8, is a detail perspective view of the car-carried shoe or contact maker. Fig. 9, is a similar view of the track contact member. Fig. 10, is a detail side elevation thereof. Fig. 11, is a diagrammatic view of the track and car circuits. Fig. 12, is a view similar to Fig. 3, showing the simplest form of our valve operating mechanism. Fig. 13, is a perspective view of the bell relay. Fig. 14, is a side elevation thereof. Fig. 15, is a top plan view thereof.

Referring now to the accompanying drawings, in which like letters and numerals of reference indicate like parts in all of the figures, 1 represents the housing to which the valve 10 of the air line is secured, the valve 10 being the ordinary Westinghouse air valve, or any other valve of an approved type, and this valve is inserted in the air line below the engineer's valve so as to be independent of the engineer's control. The valve 10 corresponds to the "conductor's valve" of the air brake system. The valve 10 has its stem projected into the casing 1 and provided with a gear or gear segment 2 and a lever 3 having a handle 4 to project through the slot $1^a$ in the housing 1 whereby the valve may be moved, when it is open, to its closed position, in a manner to be hereinafter more fully explained.

5 designates a shaft mounted in bearings in the housing walls and carrying a master worm gear 6 that is keyed at 7 to turn with the shaft 5 and is driven by the worm 8 on the shaft 9 of the rotatable motor 11. The shaft 5 also has keyed thereto a pinion 12 that meshes with a master gear 13 on another shaft 14, the gear 13 being keyed to the shaft 14 and having a sleeve 15 and a pinion 16 which meshes with a second master gear 17, that turns loosely on the shaft 5 and carries a mutilated gear 18 that coöperates with the gear 2 on the valve shaft $10^a$, the mutilated gear 18 has the gear segments $18^a$—$18^a$ and the mutilated portions $18^b$—$18^b$ alternately arranged.

19 designates pins arranged at suitable intervals along the gear 17 to coöperate with the locking lever 20 of the relay 21. The relay 21 comprises the base 22 of insulating material on which the magnets 23 are mounted, and the magnets 23 each coöperate with an armature 24 having a vertically disposed portion $24^a$ and a horizontal portion $24^b$ at right angles thereto, the armature being pivoted at $25^a$ in a bracket 26 to swing to its normal circuit opening position by gravity. In front of the armature 24 is a contact block 27 that is carried by the armature and when the armature is moved by the magnets 23, the block 27 will close the gap between the resilient contacts 28 and 29, respectively. The contacts 28 and 29 are secured at 30 and 31 respectively, to the base 22 and are connected to the local motor operating circuit 32. The circuit 32 includes the source of electrical energy 33 and the motor 11. The lever 20 is fulcrumed at 34 to the bracket 35 and has a heel portion 20ª to engage the insulated stepped-block 36 carried by the armature 24, and lock the armature in its circuit opening and closing positions.

37 designates the track contact members, of which there are two to complete the circuit, one at each side of the track. The members 37 are each composed of a series of pipes 37ª having downwardly bent ends 37ᵇ and mounted on standards 38 that are secured to the ties 39 upon which the track is mounted and electrically connected. The track contacts 37 coöperate with the brushes 40 mounted on the supports 41 and carried by the locomotive to complete the electric circuit. The main car carried circuit consists of the wire 42 that is electrically connected with the brush 40, at one side of the locomotive and connects with the car carried source of electrical energy 43 which is in electrical connection with the magnets 23 of the relay, and the magnets 23 are in electrical connection with the magnet 44 of a bell relay 45, that is in turn electrically connected with the other brush 40 at the opposite side of the locomotive.

The bell relay, which is more clearly shown in Fig. 13, of the drawings, comprises the magnets 44, the armature 46, that is pivoted at 47 to a bracket 48 and carries the contact or circuit closing member 49 that closes the bell circuit by closing the gap between the resilient contact members 50 and 51 that are in circuit with the bell 52 and the bell battery 53, as clearly indicated in Fig. 11, of the drawings.

The armature 46 is provided with a stepped insulated block 55 to coöperate with the locking armature 56 of the releasing magnet 57 that is operated through the medium of a "push button" 58 and a local battery 59 that is in electrical connection with the magnet 57 in a manner to be presently more fully explained. The armature 46 may be of the gravity dropped type to open the circuit at the contacts 50 and 51, or a spring 58ˢ may be provided for this purpose, if desired. The circuit between the track contacts 37—37 may be closed in any approved manner, either by a circuit closing switch in the tower operator's room or by a knife circuit closing switch, such for instance as is shown in Fig. 11 of the drawings that is connectible to the rotatable shaft of a semaphore arm.

When the circuit between the track contacts 37 is to be closed by the action of a semaphore the switch 60 may be secured to the rotatable shaft of the semaphore, (not shown) so that as the semaphore arm moves into its "danger" position, the switch 60 will close the circuit between the terminals 61 and 62 that are in electrical connection through wires 63 with the track contacts 37—37, see Fig. 11, or any suitable means may be provided to close the circuit between the track contacts 37 and thus short circuit the brushes 40 of the locomotive and close the circuit containing the battery 43, thus permitting the relay 21 to be operated to close the local valve motor circuit and also the bell signal circuit.

Operation: In the practical operation of our invention, let us assume it is desired to stop a train which runs past a semaphore signal. The semaphore shaft will be provided with a circuit closing means, such as has hereinbefore been described, so as to short circuit the track contacts 37—37 to which it is connected, there being a track contact on each side of the track, say, located in front of the semaphore, or at a short distance therefrom. Should the engineer run by the "danger" signal of the semaphore, which has closed, or short-circuited the contacts 37—37 at each side of the track, the train shoes 40 as they come in contact with the track contacts 37 will close the electric circuit between such contacts and the train-carried portion of the circuit, thus permitting an electric current to flow from the battery 43 through the magnets 23 of the relay 21 and the magnets 44 of the bell relay 45 to the shoe 40 at one side of the train, and from thence to the corresponding track contact 37 across the short circuiting means, (via the circuit closure in the semaphore) to the opposite track contact 37 and from thence through the other shoe or brush 40 to return to the battery 43. This flowing of the current causes the magnets 44 to attract the armature 46 and close the bell circuit at the contacts 50 and 51, thus ringing the bell 52, which may be located in the engineer's cab. Simultaneously the magnets 23 of the relay 21 will attract their armature 24 and close the local valve motor circuit through the contacts 28 and 29, thus permitting the energy from the battery 33 to set the motor 11 in operation. In the normal position of parts, with the valve 10 closed, the mutilated gear portion first alines with the gear 2 and thus it will take several seconds before the gear part of the mutilated gear 18 engages the gear 2 and starts to open the valve 10. In practice, with the forms of my invention shown in Figs. 1, 2 and 3, the time elapsing between the starting of the motor 11 and the commencement of the opening of the valve 10 is about seven seconds, thus giving the engineer time to operate his valve should he merely have run by the semaphore by accident, such as may be due to fog, which would render the semaphore invisible. Should the engineer have been endeavoring to creep by the signal, the motor 11 through the gear connections with the valve 10 will open the valve 10, and thus permit the air brakes to operate and stop the train, irrespective of the engineer's control. As the valve 10 reaches its open position a mutilated portion of the gear 18 will come into alinement with the gear 2, and no longer act upon the same. At this time also the pin 19 will engage the locking lever 20 of the relay 21 and release the armature 24 which will gravitate to its circuit opening position to break the local motor circuit at the contacts 28 and 29, and hence stop the operation of the motor 11.

In practice, the valve operating mechanism is disposed under the seat in the engineer's cab, and may be kept in a closed locker, thus necessitating the engineer opening the locker before the valve can be reclosed. After the valve has been automatically opened, as hereinbefore stated, and the train has come to a stop, the engineer may reset the valve to its closed position by the handle 4 since the mutilated portion of the gear 18 is in alinement with the gear 2 and hence the gear 18 will be left undisturbed.

In Fig. 12, we have shown the simplest form of our invention in which the motor 11 is directly geared with the valve shaft through a master gear 60 which has peripheral teeth 60ª to mesh with a pinion 65 on the shaft of the motor 11 so that the rotation of the motor 11 will be imparted to the gear 60 and pulley on the shaft 10ª of the valve 10 to open the same and as the gear 60 rotates and the valve 10 reaches its open position the pin 60ˣ on the gear will engage the locking lever 20 of the relay 21 and break the motor circuit. In this form of our invention the mutilated gear may be omitted, since the valve can be returned to its open position by the handle 4ˣ by means of which the gear 60 may be turned back, this action being possible by virtue of the fact that the pinion 65 and the gear 60 are in mesh in the ordinary manner, so that the rotation of the gear 60 backwardly will simply rotate the shaft of the motor 11 backwardly a corresponding distance.

Our present invention may be used in connection with any semaphore signaling system and on any railroad now in existence, as it does not necessitate changing the present construction of the railroads or signaling system.

From the foregoing description taken in connection with the accompanying drawings, it is thought the complete construction, operation and numerous advantages of our invention will be readily understood by those skilled in the art to which the invention appertains.

What we claim is:

1. In a train stopping mechanism, the combination with an air brake system including an engineer's valve, of an independent air valve connecting with the air brake train pipe and a rotatable shaft electric motor directly geared with the valve shaft, electromagnetic means for setting said motor into operation to operate said valve, and means for automatically rendering said electromagnetic means inoperative to stop the operation of the motor at times.

2. In a train stopping mechanism, means for operating the air valve of an air brake system, said means comprising a rotatable shaft motor geared with the valve shaft or stem, an electric circuit including said motor, a relay for automatically closing said electric circuit to start said motor into operation to open said valve, and means for automatically actuating the armature of said relay to break the motor circuit as the valve reaches its open position.

3. In a train stopping mechanism, the combination with an air brake system of a train including an engineer's valve, of a supplemental air valve connected therewith, operating when opened to set the brakes, of means controlled independently of the train for operating said valve to set the air brakes, said last named means comprising an electric motor connected with said valve to operate the same, a normally open electric circuit for said motor, train carried contacts, a relay in circuit with said train carried contacts and with said motor, normally open track contacts adapted to be engaged by said train carried contacts, means for short-circuiting said track contacts to close the motor circuit, said motor circuit including a source of electrical energy and means for automatically opening the motor circuit after the valve has been opened.

4. In a train stopping mechanism, the combination with an air brake system of a train, of an air valve connected therewith, operating when opened to set the brakes, of means controlled independently of the train for operating said valve on the train, to set the air brakes, said last named means comprising an electric motor connected with said valve to operate the same, train-carried contacts electro-operatively connected with said motor, track contacts adapted to be engaged by said train carried contacts, means for short-circuiting said track contacts to close the motor circuit, said motor circuit including a source of electric energy and means for automatically breaking the motor circuit when the air valve has been opened.

5. In a train stopping mechamsm, the combination with an air brake system of a train, of an air valve connected therewith, operating when opened to set the brakes, of means controlled independently of the train for operating said valve on the train to set the air brakes, said last named means comprising an electric motor connected with said valve to operate the same, train-carried contacts electro-operatively connected with said motor, track contacts adapted to be engaged by said train carried contacts, means for short-circuiting said track contacts to close the motor circuit, said motor circuit including a source of electrical energy, a local signal relay electrically connected with said train carried contacts whereby when said train carried contacts engage the track contacts, said local signal relay will be operated, a local signal and source of energy therefor in circuit with said local relay, and means for automatically stopping the motor when the air valve has been opened.

6. In a train stopping mechanism the combination with an air brake system of a train including an engineer's valve, and an independent air valve connected with the air brake train pipe, a rotatable shaft electric motor geared with the valve shaft, train carried contacts, a train carried relay and source of electric energy in circuit with said train carried contacts, track contacts adapted to be engaged by the train carried contacts at times, and means for short-circuiting the track contacts at times to complete the relay circuit, a motor circuit in which said rotatable motor is connected, a source of electric energy for the motor circuit, said motor circuit connected with said relay whereby when the relay circuit is closed the motor circuit will be closed and means for actuating the armature of the relay to open the motor circuit when the air valve has been opened.

7. In a train stopping mechanism, the combination with an air brake system of a train, of an air valve connected therewith, operating when opened to set the brakes, of means controlled independently of the train for operating said valve on the train to set the air brakes, said last named means comprising an electric motor connected with said valve to operate the same, train-carried contacts electro-operatively connected with said motor, track contacts adapted to be engaged by said train carried contacts, means for short-circuiting said track contacts to close the motor circuit, said motor circuit including a source of electric energy, a local signal relay connected to the said train carrying contacts whereby when the train carrying contacts engage the track contacts the relay will be operated, the local signal and the source of electrical energy therefor in circuit with said relay, means for automatically stopping the motor when the air valve has been opened, and manually controlled means for breaking the local signal circuit.

8. In a train stopping device, an air valve having a rotatable valve stem, a gear carried thereby, a rotatable shaft, a mutilated gear mounted on said rotatable shaft and coöperating with the valve stem gear, an electric motor geared with said rotatable shaft and said mutilated gear to impart motion thereto at times.

9. In a train stopping device, an air valve having a rotatable valve stem, a gear carried thereby, a rotatable shaft, a mutilated gear mounted on said rotatable shaft end coöperating with the valve stem gear, an electric motor geared with said rotatable shaft and said mutilated gear to impart motion thereto at times, and manually operated means for turning said valve stem.

10. In a train stopping device, an air valve having a rotatable valve stem, a gear carried thereby, a rotatable shaft, a mutilated gear mounted on said rotatable shaft and coöperating with the valve stem gear, an electric motor geared with said rotatable shaft and said mutilated gear to impart motion thereto at times, and electrically controlled means for operating said motor.

11. In a train stopping device, an air valve having a rotatable valve stem, a gear carried thereby, a rotatable shaft, a mutilated gear mounted on said rotatable shaft and coöperating with the valve stem gear, an electric motor geared with said rotatable shaft and said mutilated gear to impart motion thereto at times, electrically controlled means for operating said motor, and means for rendering said motor inoperative when the valve stem has been turned to a predetermined position.

12. In a train stopping mechanism, an air valve connected with the train pipe of the air brake system, said valve having a rotatable valve stem, a gear carried thereby, a mutilated gear coöperating with said last named gear, a rotatable shaft electric motor, a train of gears connecting said motor shaft with said mutilated gear to operate the same, a local electric circuit for said motor, means for closing the motor circuit at times, and means controlled by the movement of said train of gears for opening the motor circuit at other times.

13. In a train stopping mechanism, an air valve connected with the train pipe of the air brake system, said valve having a rotatable valve stem, a gear carried thereby, a mutilated gear coöperating with said last named gear, a rotatable shaft electric motor, a train of gears connecting said motor shaft with said mutilated gear to operate the same, a local electric circuit for said motor, means for closing the motor circuit at times, means controlled by the movement of said train of gears for opening the motor circuit at other times, said motor circuit closing means comprising an electro-magnetic relay.

14. In a train stopping mechanism, an air valve connected with the train pipe of the air brake system, said valve having a rotatable valve stem, a gear carried thereby, a mutilated gear coöperating with said last named gear, a rotatable shaft electric motor, a train of gears connecting said motor shaft with said mutilated gear to operate the same, a local electric circuit for said motor, means for closing the motor circuit at times, means controlled by the movement of said train of gears for opening the motor circuit at other times, said motor circuit closing means comprising an electro-magnetic relay, and said means for opening the motor circuit comprising pins carried by the train of gears, and a releasing lever carried by said relay for breaking the electric circuit at the relay.

15. In a valve operating means for air brakes, a rotatable shaft motor geared with the valve shaft, a relay electrically connected with said motor, means for energizing said relay to close the electrical connection with the motor and set said motor in operation, and means for automatically operating the relay armature to stop the motor when the valve has been opened.

JEAN F. WEBB.
JEAN F. WEBB, Jr.

Witnesses:
JAMES J. RAGAN,
JOHN F. MORRISON.